(12) United States Patent
Yu

(10) Patent No.: US 11,740,711 B2
(45) Date of Patent: Aug. 29, 2023

(54) MOUSE

(71) Applicant: Chicony Electronics Co., Ltd., New Taipei (TW)

(72) Inventor: Wei-Chih Yu, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 17/475,354

(22) Filed: Sep. 15, 2021

(65) Prior Publication Data

US 2023/0028811 A1 Jan. 26, 2023

(30) Foreign Application Priority Data

Jul. 21, 2021 (TW) .................................. 110126783

(51) Int. Cl.
*G06F 3/0354* (2013.01)
*H01H 13/85* (2006.01)

(52) U.S. Cl.
CPC ......... *G06F 3/03543* (2013.01); *H01H 13/85* (2013.01); *G06F 2203/0333* (2013.01); *H01H 2227/032* (2013.01)

(58) Field of Classification Search
CPC ........ G06F 3/03543; G06F 2203/0333; H01H 13/85; H01H 2227/032
See application file for complete search history.

(56) References Cited

U.S. PATENT DOCUMENTS

| 2004/0012568 A1* | 1/2004 | Velikov | G06F 3/03548 345/163 |
| 2009/0009473 A1* | 1/2009 | Ho | G06F 3/03543 345/163 |
| 2010/0029449 A1* | 2/2010 | Kim | A63B 21/4047 482/121 |

FOREIGN PATENT DOCUMENTS

| CN | 202093488 | 12/2011 |
| CN | 106406575 | 2/2017 |
| CN | 207473560 | 6/2018 |
| CN | 211463616 | 9/2020 |
| TW | 200907637 | 2/2009 |
| TW | 201913310 | 4/2019 |
| TW | M595258 | 5/2020 |

OTHER PUBLICATIONS

"Office Action of Taiwan Counterpart Application", dated Jan. 5, 2022, p. 1-p. 7.

* cited by examiner

*Primary Examiner* — Hang Lin
(74) *Attorney, Agent, or Firm* — JCIPRNET

(57) ABSTRACT

A mouse includes a main housing, a key structure, and a pressing force adjusting component. The key structure has a connecting end, a free end, and an elastic section. The connecting end is connected to the main housing, and the elastic section is located between the connecting end and the free end. The pressing force adjusting component is movably disposed on the main housing and has a limiting portion, and the limiting portion limits elastic deformation of the elastic section. A location of the pressing force adjusting component on the main housing is adapted to be changed to change a location of the limiting portion at the elastic section.

12 Claims, 13 Drawing Sheets

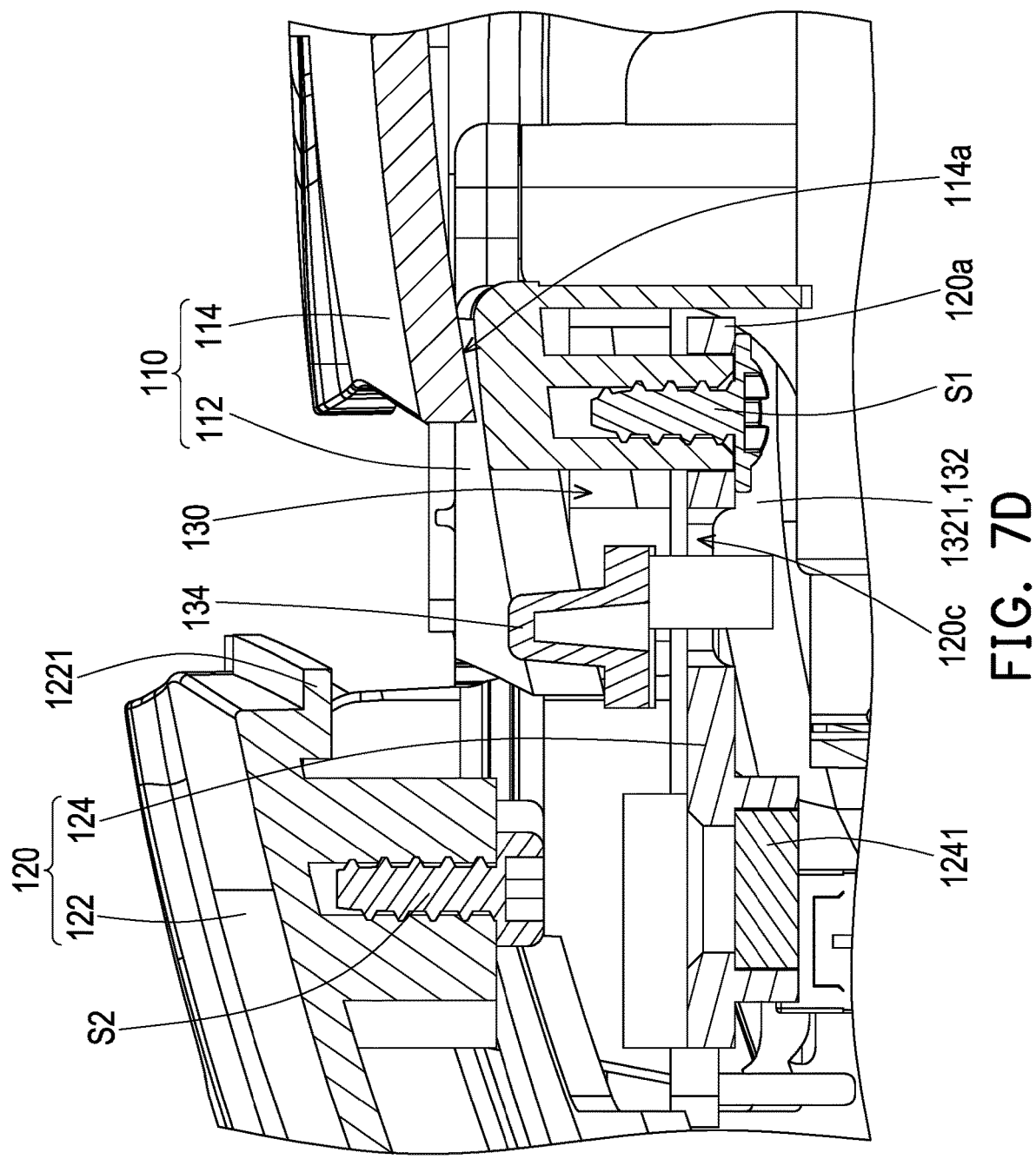

MOUSE

CROSS-REFERENCE TO RELATED APPLICATION

This application claims the priority benefit of Taiwan application serial no. 110126783, filed on Jul. 21, 2021. The entirety of the above-mentioned patent application is hereby incorporated by reference herein and made a part of this specification.

BACKGROUND

Technical Field

The disclosure relates to an input device; more particularly, the disclosure relates to a mouse.

Description of Related Art

Mice are one of the most common input devices in computer devices, and the mice mostly have left and right buttons for users to press and input commands. A pressing force on the mouse button (i.e., the minimum pressing force required by the button to trigger a switch element in the mouse) may be determined according to a distance between a fixed end and a free end of the button. The greater the distance, the less the required pressing force; the shorter the distance, the more the required pressing force. In addition, in the existing mice, the distance between the fixed ends and the free ends of the buttons is fixed and unchangeable, so that the user cannot adjust the pressing force applied to the mouse buttons based on actual needs. In addition, many mouse buttons are magnetically connected to the mouse bodies. Therefore, when the mice are dropped, the buttons may be easily separated from the mouse bodies, so that internal parts of the mouse fall, or the buttons are damaged.

SUMMARY

The disclosure provides a mouse, and a pressing force on a button of the mouse may be adjusted according to actual requirements.

In an embodiment of the disclosure, a mouse including a main housing, a key structure, and a pressing force adjusting component is provided. The key structure has a connecting end, a free end, and an elastic section. The connecting end is connected to the main housing, and the elastic section is located between the connecting end and the free end. The pressing force adjusting component is movably disposed on the main housing and has a limiting portion, and the limiting portion limits elastic deformation of the elastic section. A location of the pressing force adjusting component on the main housing is adapted to be changed to change a location of the limiting portion at the elastic section.

In an embodiment of the disclosure, a first distance exists between a first location on the elastic section and the free end, a second distance exists between a second location on the elastic section and the free end, and a third distance exists between the connecting end and the free end. The third distance is greater than the second distance, and the second distance is greater than the first distance. The pressing force adjusting component is adapted to move along the main housing to drive the limiting portion to move between the first location and the second location.

In an embodiment of the disclosure, the pressing force adjusting component has a first positioning portion and a second positioning portion, and the main housing has a positioning structure. When the limiting portion is located at the first location, the second positioning portion is located at the positioning structure; when the limiting portion is located at the second position, the first positioning portion is located at the positioning structure.

In an embodiment of the disclosure, the key structure includes a key housing and an elastic component. Here, the elastic component has the connecting end and the elastic section, and the key housing is connected to the elastic component and has the free end.

In an embodiment of the disclosure, the key housing and elastic component are magnetically attracted.

In an embodiment of the disclosure, the key housing has a flange, and an inner surface of the main housing stops the flange to prevent the key housing from escaping from the main housing.

In an embodiment of the disclosure, the main housing has a sliding slot, and the pressing force adjusting component is slidably disposed at the sliding slot.

In an embodiment of the disclosure, the limiting portion includes at least one hook which is engaged with a lower surface of the elastic section.

In an embodiment of the disclosure, the main housing includes a base and a rear case, the rear case is assembled to the base, the pressing force adjusting component is movably disposed on the base, and the connecting end of the key structure is connected to the rear case.

In an embodiment of the disclosure, the pressing force adjusting component has a push button, the rear case is adapted to move relative to the base to expose the push button, and the push button is adapted to be forced to drive the pressing force adjusting component to move along the base.

In an embodiment of the disclosure, the mouse includes a switch element. Here, the switch element is disposed at the main housing, the free end of the key structure has a triggering portion, and the key structure is adapted to be pressed to trigger the switch element by the triggering portion.

In an embodiment of the disclosure, the key structure has two extension sections which are respectively connected to two opposite ends of the elastic section, and a thickness of the elastic section is less than a thickness of the two extension sections.

In an embodiment of the disclosure, the pressing force adjusting component is a cylinder, the elastic section has at least two holes, and the cylinder is adapted to pass through either of the two holes and be connected to the main housing.

In view of the above, in the mouse provided in one or more embodiments of the disclosure, the elastic section of the key structure is further equipped with the pressing force adjusting component. Users may change the location of the pressing force adjusting component on the main housing to adjust the location of the limiting portion of the pressing force adjusting component at the elastic section, thereby changing a length of a lever arm of the key structure and accordingly achieving effects of adjusting the pressing force on the key structure.

To make the above mentioned more comprehensible, several embodiments accompanied by drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 7A to FIG. 7D illustrate an adjustment process of the pressing force adjusting component depicted in FIG. 2.

DESCRIPTION OF THE EMBODIMENTS

Figure 1:
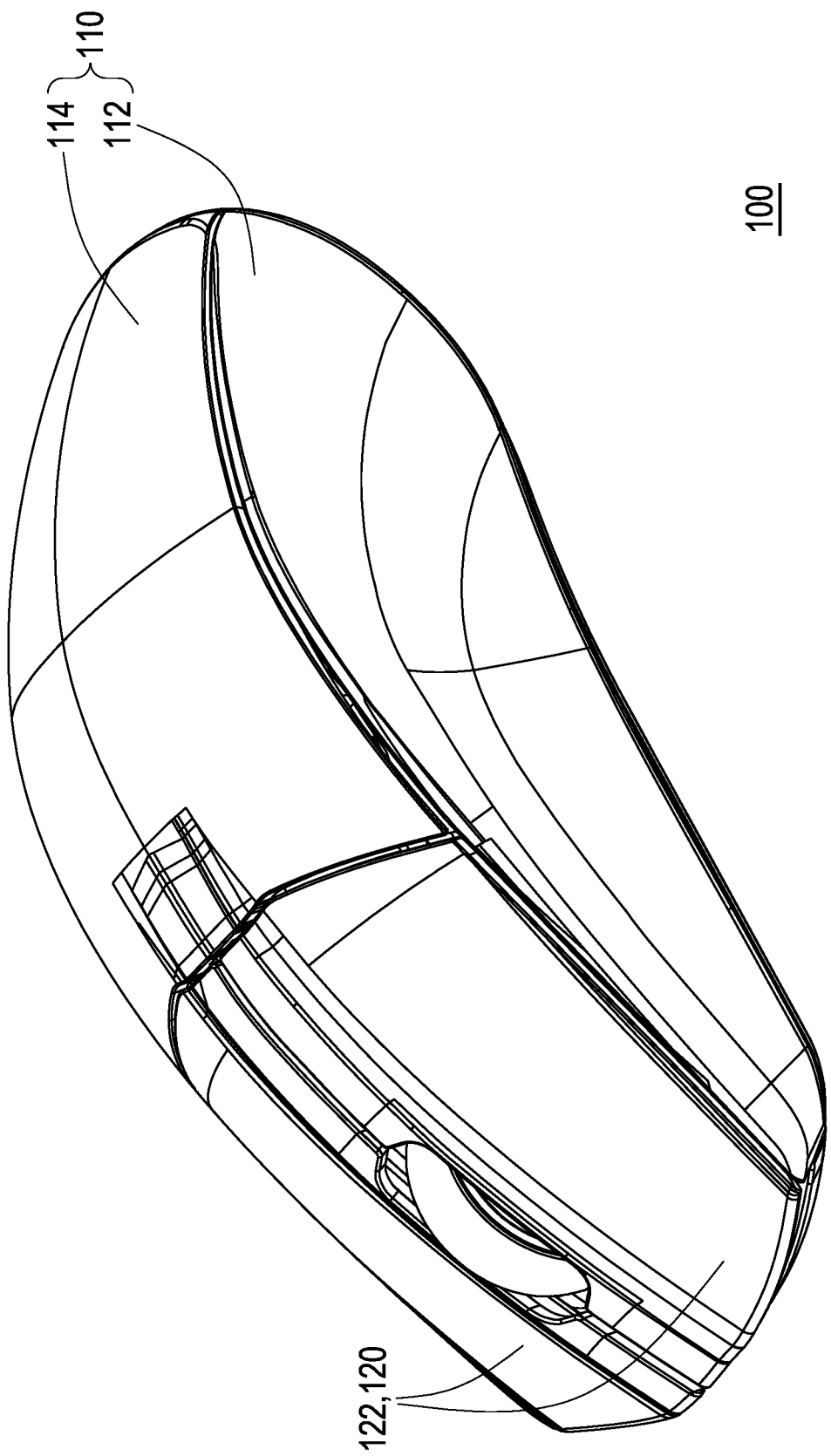
FIG. 1 is a three-dimensional view of a mouse according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Figure 2:
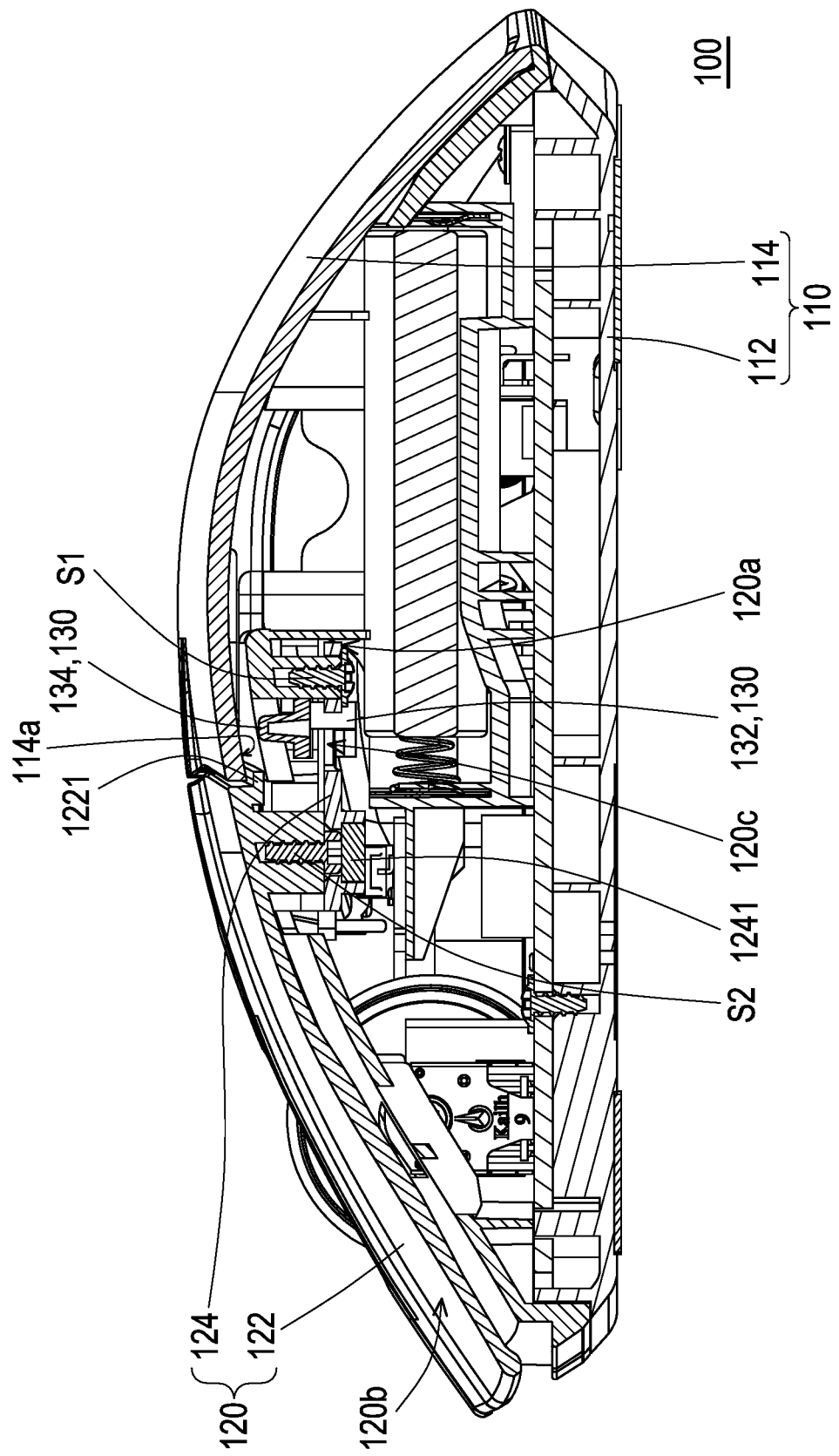
FIG. 2 is a side view illustrating a partial structure of the mouse depicted in FIG. 1.
Figure 3:
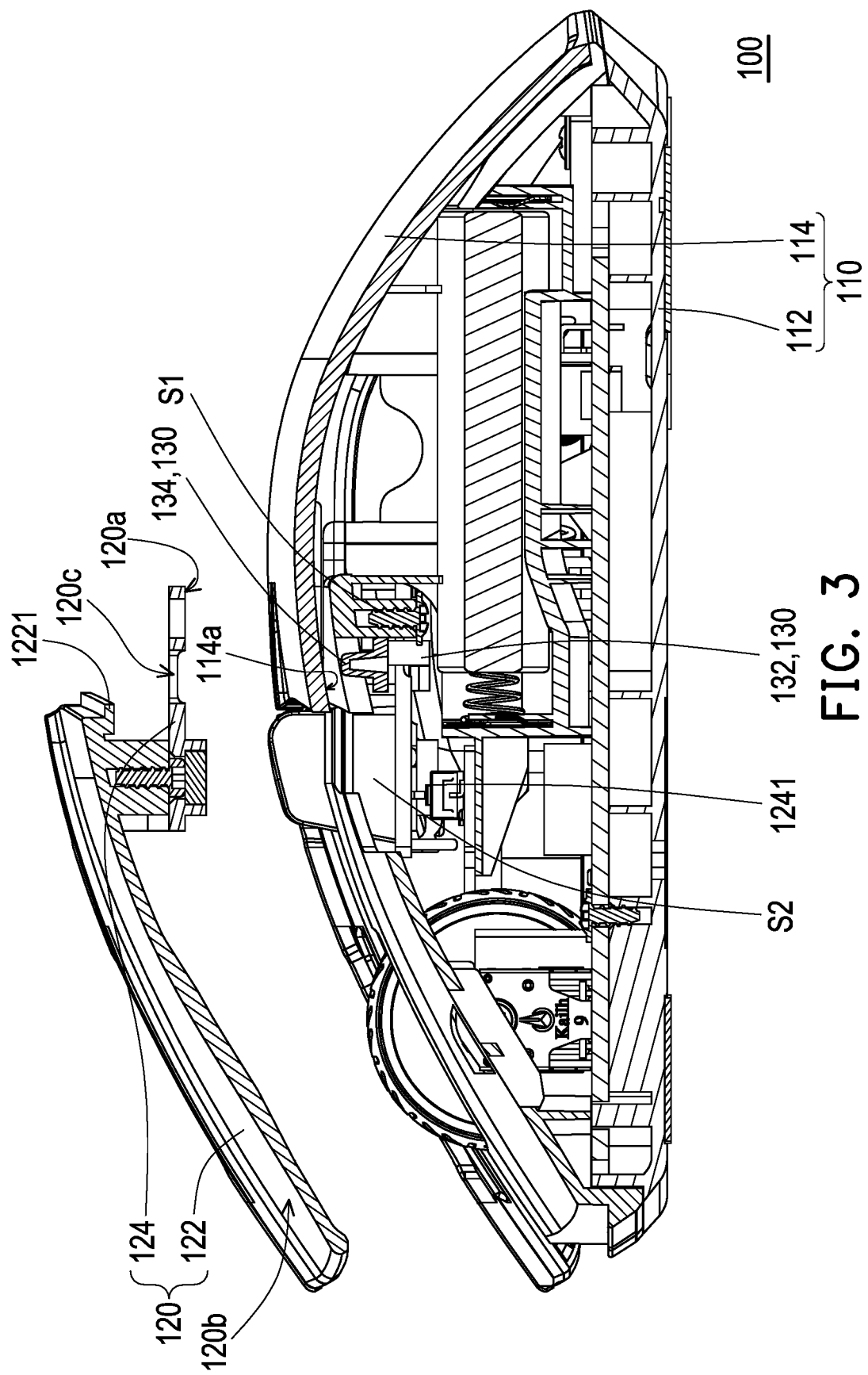
FIG. 3 is an exploded view illustrating the mouse depicted in FIG. 2.

FIG. 1 is a three-dimensional view of a mouse according to an embodiment of the disclosure. FIG. 2 is a side view illustrating a partial structure of the mouse depicted in FIG. 1. FIG. 3 is an exploded view illustrating the mouse depicted in FIG. 2. With reference to FIG. 1 to FIG. 3, a mouse 100 provided in this embodiment includes a main housing 110, a key structure 120, and a pressing force adjusting component 130. The main housing 110 includes a base 112 and a rear case 114, and the rear case 114 is assembled to the base 112. The key structure 120 has a connecting end 120a, a free end 120b, and an elastic section 120c. The elastic section 120c is located between the connecting end 120a and the free end 120b. The connecting end 120a is connected to the base 112 of the main housing 110. Here, the connecting end 120a is, for instance, screwed to the base 112 by a screw lock 51. The pressing force adjusting component 130 is movably disposed on the base 112 of the main housing 110 and has a limiting portion 132, and the limiting portion 132 limits elastic deformation of the elastic section 120c. The pressing force adjusting component 130 is adapted to move along the base 112 of the main housing 110 to change a location of the pressing force adjusting component 130 on the main housing 110, whereby a location of the limiting portion 132 at the elastic section 120c is changed.

As described above, in the mouse 100 provided in this embodiment, the elastic section 120c of the key structure 120 is further equipped with the pressing force adjusting component 130. A user may move the pressing force adjusting component 130 to adjust the location of the limiting portion 132 of the pressing force adjusting component 130 at the elastic section 120c, thereby changing a length of a lever arm of the key structure 120 and accordingly achieving effects of adjusting the pressing force on the key structure 120.

Figure 4:
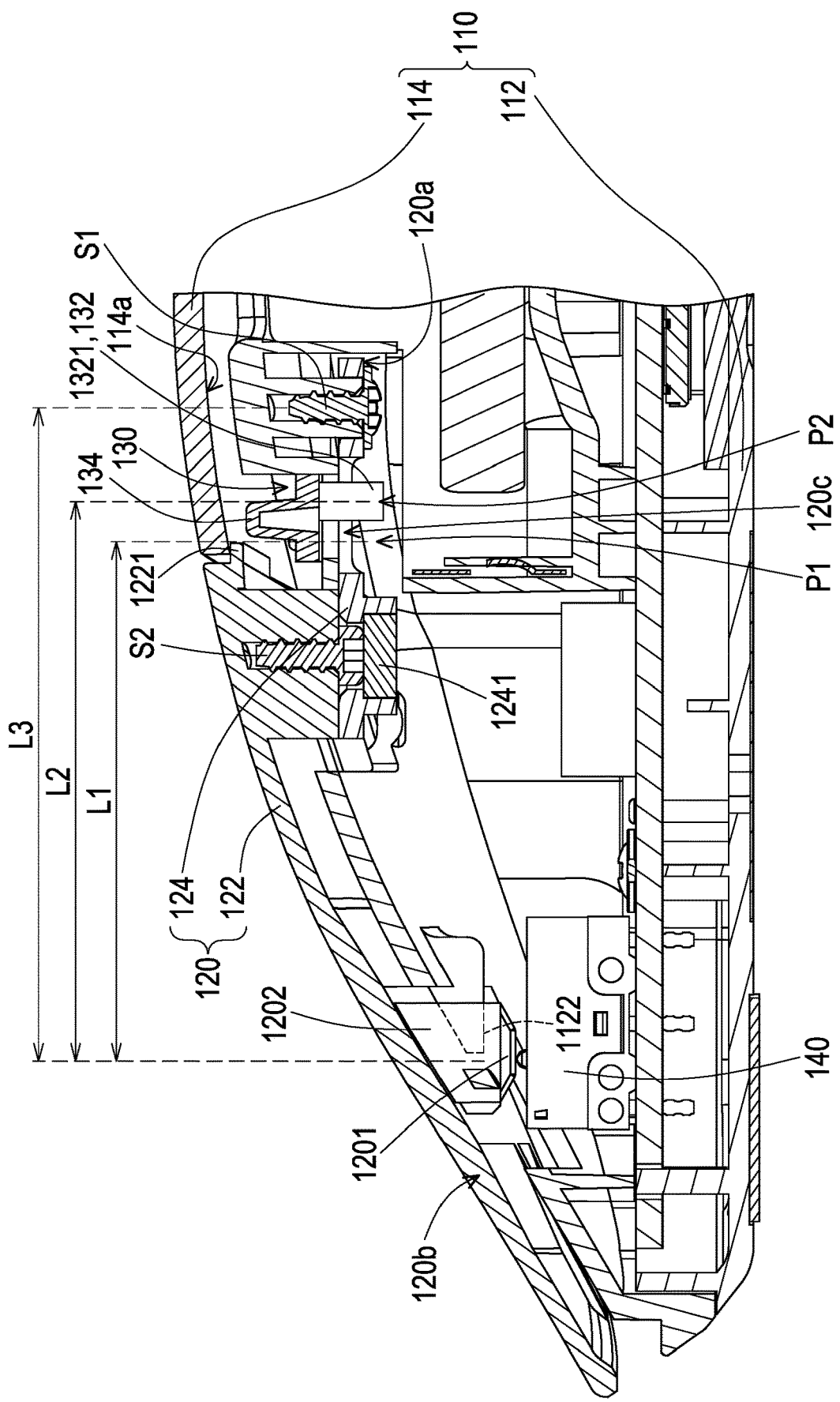
FIG. 4 is a side view illustrating a partial structure of the mouse depicted in FIG. 1.

FIG. 4 is a side view illustrating a partial structure of the mouse depicted in FIG. 1. With reference to FIG. 4, specifically, the mouse 100 provided in this embodiment includes a switch element 140, and the switch element 140 is disposed on a base 112 of the main housing 110. The free end 120b of the key structure 120 has a triggering portion 1201, and the key structure 120 is adapted to be pressed to trigger the switch element 140 by the triggering portion 1201. Here, a first distance L1 exists between a first location P1 on the elastic section 120c and the triggering portion 1201 of the free end 120b, a second distance L2 exists between a second location P2 on the elastic section 120c and the triggering portion 1201 of the free end 120b, and a third distance L3 exists between the connecting end 120a and the triggering portion 1201 of the free end 120b. Here, the second distance L2 is greater than the first distance L1, and the third distance L3 is greater than the second distance L2. The pressing force adjusting component 130 is adapted to move along the base 112 of the main housing 110 and drive the limiting portion 132 to move between the first location P1 and the second location P2.

In view of the above, when the limiting portion 132 is located at the first location P1, the first location P1 is equivalent to a fixed end of the key structure 120. On this condition, when the key structure 120 is being pressed at the triggering portion 1201 of the free end 120b, the lever arm of the key structure 120 (i.e., the first distance L1) is shorter, so that the minimum pressing force required by the triggering portion 1201 for triggering the switch element 140 is larger. By contrast, when the limiting portion 132 is located at the second location P2, the second location P2 is equivalent to the fixed end of the key structure 120. On this condition, when the key structure 120 is being pressed at the triggering portion 1201 of the free end 120b, the lever arm of the key structure 120 (i.e., the second distance L2) is longer, so that the minimum pressing force required by the triggering portion 1201 for triggering the switch element 140 is smaller. To be specific, the pressing force adjusting component 130 provided in this embodiment may be configured to be detachable, so that the user may remove the pressing force adjusting component 130. When the pressing force adjusting component 130 and its limiting portion 132 are removed, the connecting end 120a is equivalent to the fixed end of the key structure 120. On this condition, when the key structure 120 is being pressed at the triggering portion 1201 of the free end 120b, the lever arm of the key structure 120 (i.e., the third distance L3) is even longer, so that the minimum pressing force required by the triggering portion 1201 for triggering the switch element 140 is even smaller.

For instance, the first distance L1 may be 31.35 millimeters (mm), the second distance L2 may be 33.75 mm, and the third distance L3 may be 39.4 mm. In a state where the pressing force adjusting component 130 and its limiting portion 132 are removed, if the minimum pressing force required by the triggering portion 1201 for triggering the switch element 140 is 70 grams (g), then its torque is the product obtained by multiplying the third distance L3 by this minimum pressing force, i.e., 39.4 mm*70 g=2758 g-mm. In light of the foregoing, with the limiting portion 132 is located at the second location P2, the minimum pressing force required by the triggering portion 1201 for triggering the switch element 140 is the torque value divided by the second distance L2, that is, 2758 g-mm/33.75 mm=81.7 g. Similarly, when the limiting portion 132 is located at the first location P1, the minimum pressing force required for the triggering portion 1201 to trigger the switch element 140 is obtained by dividing the torque by the first distance L1, i.e., 2758 g-mm/31.35 mm=88 g. In other words, based on the state where the pressing force adjusting component 130 and its limiting portion 132 are removed (the pressing force is 70 g), when the limiting portion 132 is located at the second location P2, an additional force of 16.7% is required to be applied to the pressing force, and the switch element 140 may be triggered if the pressing force reaches 81.7 g. Besides, based on the state where the pressing force adjusting component 130 and its limiting portion 132 are removed (the pressing force is 70 g), when the limiting portion 132 is located at the first location P1, an additional force of 25.7% is required to be applied to the pressing force, and the switch element 140 may be triggered if the pressing force reaches 88 g. Furthermore, when the location of the fixed end of the key structure 120 changes due to a change to the location of the limiting portion 132, the pressing force required to trigger the switch element 140 also changes accordingly. In other embodiments, the first distance L1, the second distance L2, and the third distance L3 may be of other appropriate values, and the corresponding pressing forces may be of other appropriate values, which should not be construed as limitations in the disclosure. In addition, in other embodiments, the limiting portion 132 may be moved to more different locations other than the first location P1 and the second location P2, which should not be construed as a limitation in the disclosure.

Figure 5A:
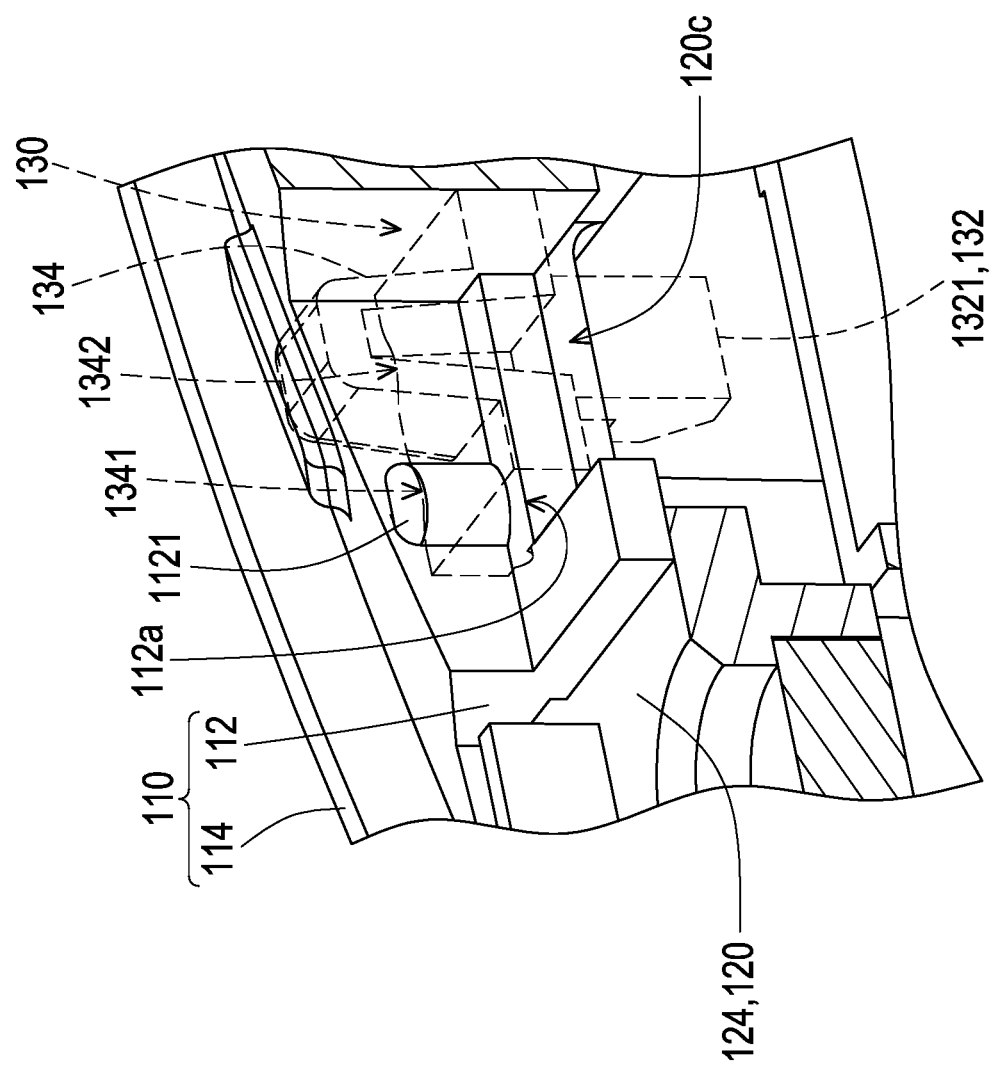
FIG. 5A is a three-dimensional view illustrating a partial structure of the mouse depicted in FIG. 4.
Figure 5B:
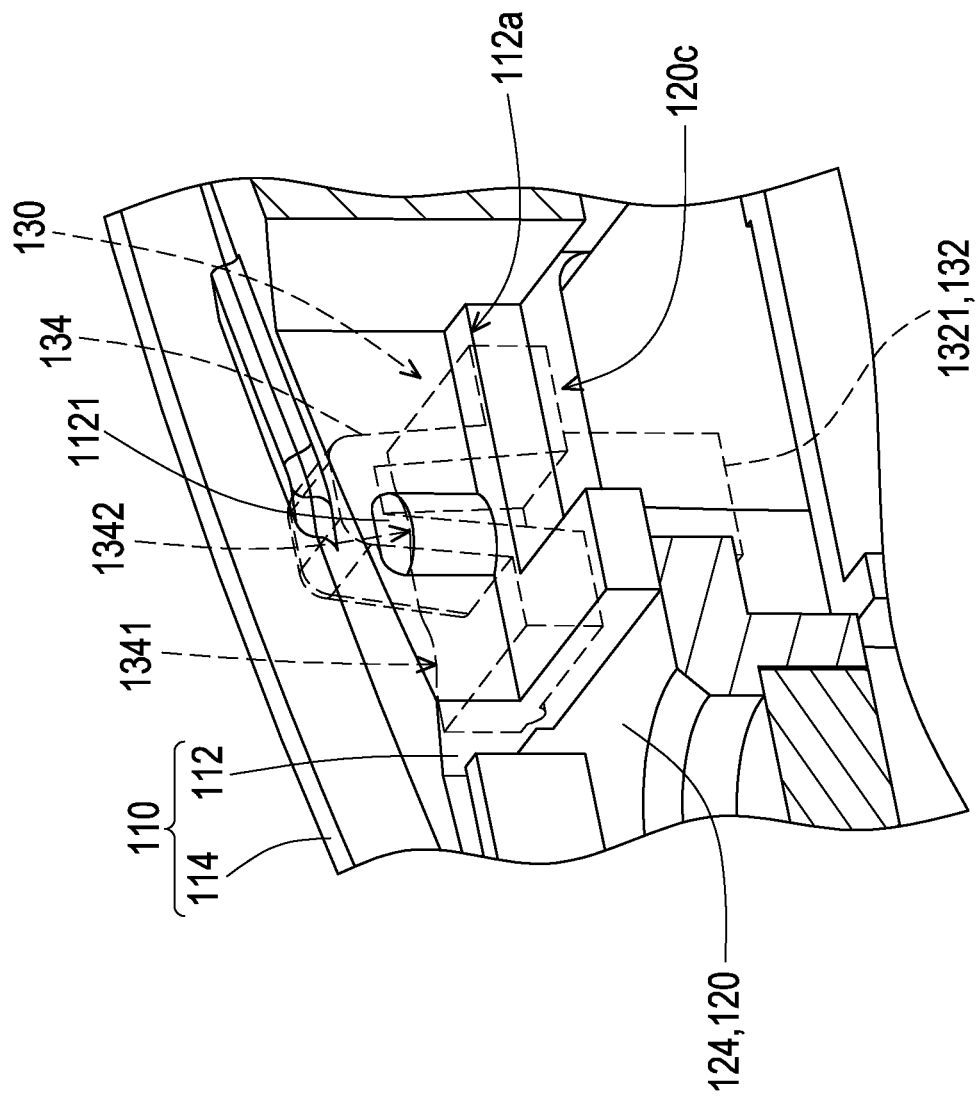
FIG. 5B illustrates movement of the pressing force adjusting component depicted in FIG. 5A.
Figure 6:
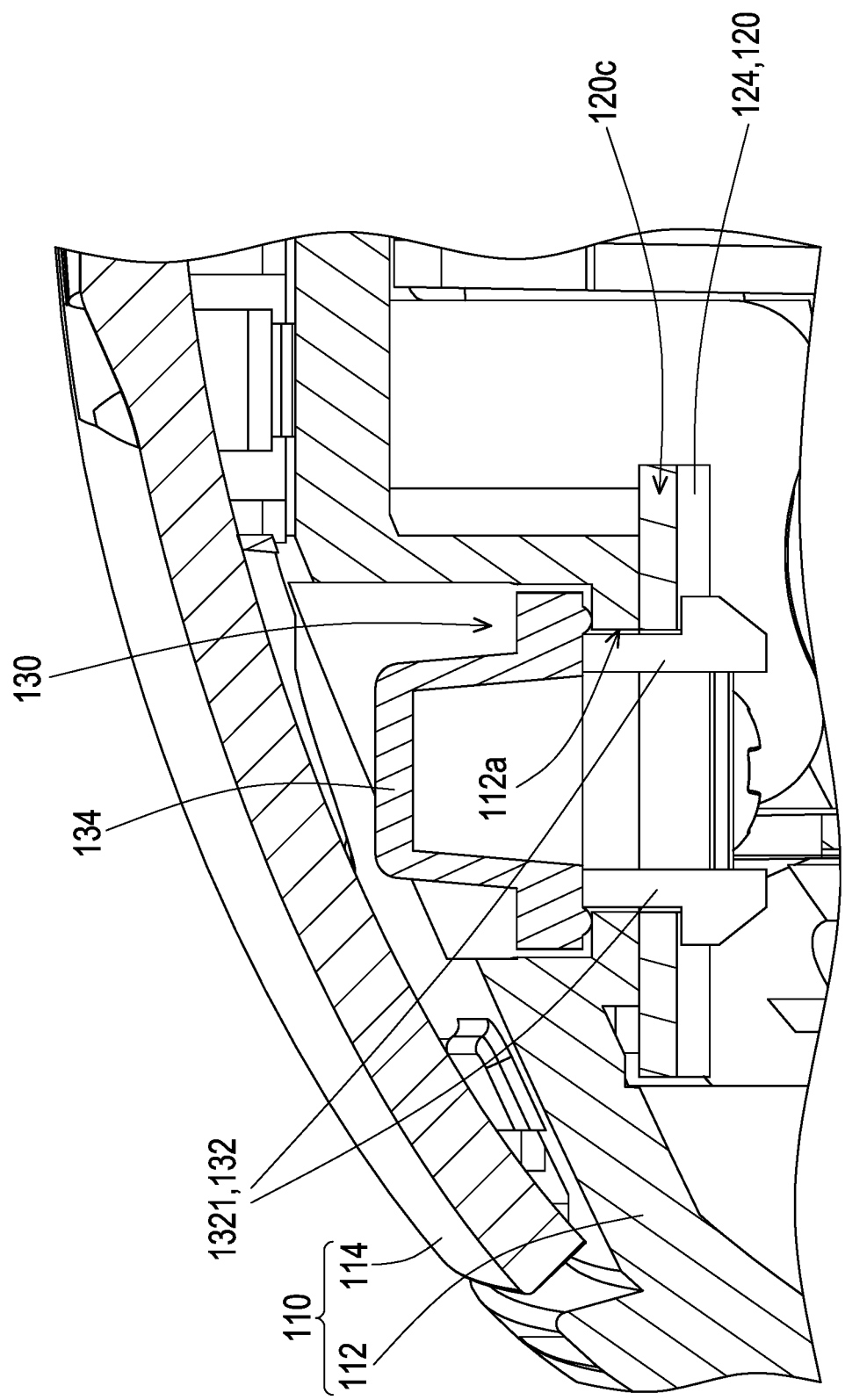
FIG. 6 is a front view illustrating a partial structure of the mouse depicted in FIG. 4.

The specific structure of the pressing force adjusting component provided in this embodiment will be described below. FIG. 5A is a three-dimensional view illustrating a partial structure of the mouse depicted in FIG. 4. FIG. 5B illustrates movement of the pressing force adjusting component depicted in FIG. 5A. FIG. 6 is a front view illustrating a partial structure of the mouse depicted in FIG. 4. With reference to FIG. 5A, FIG. 5B, and FIG. 6, the base 112 of the main housing 110 provided in this embodiment has a sliding slot 112a, and the sliding slot 112a corresponds to the elastic section 120c of the key structure 120 and overlaps at least a part of the elastic section 120c. The pressing force adjusting component 130 is slidably disposed at the sliding slot 112a and is thus able to move along the base 112 of the main housing 110 as described above. Here, the pressing force adjusting component 130 has a push button 134 for the user to push. The limiting portion 132 is connected to the push button 134 and includes at least one hook 1321 (two of which are shown in FIG. 6). The hook 1321 passes through the sliding slot 112a of the base 112, so that the pressing force adjusting component 130 is slidably disposed at the sliding slot 112. In addition, the hook 1321 is engaged with a lower surface of the elastic section 120c of the key structure 120 to limit elastic deformation of the elastic section 120c as described above.

As the limiting portion 132 slides along the sliding slot 112a, the hook 1321 slides along the lower surface of the elastic section 120c. In other words, the lower surface of the elastic section 120c not only can be engaged with the hook 1321 to limit the elastic deformation of the elastic section 120c and prevent the pressing force adjusting component 130 from escaping from the base 112, but also can perform a function of guiding the pressing force adjusting component 130 to slide. In other embodiments, the hook 1321 may be replaced by another mechanism in other forms to limit the elastic deformation of the elastic section 120c, which should not be construed as a limitation in the disclosure. For instance, the limiting portion 132 may include at least one screw which passes through the sliding slot 112a of the base 112 and the elastic section 120c. The location of the pressing force adjusting component 130 at the elastic section 120c may be changed in response to changes to the locations where the screw is locked, thereby restricting the elastic deformation of the elastic section 120c and achieving the effect of changing the length of the lever arm when the key structure 120 is being pressed.

In more detail, the pressing force adjusting component 130 has a first positioning portion 1341 and a second positioning portion 1342 located at the push button 134 of the pressing force adjusting component 130, and the base 112 of the main housing 110 has a positioning structure 1121. When the limiting portion 132 of the pressing force adjusting component 130 is located at the first location P1 (shown in FIG. 4) as shown in FIG. 5B, the second positioning portion 1342 is positioned at the positioning structure 1121. When the limiting portion 132 of the pressing force adjusting component 130 is located at the second location P2 (shown in FIG. 4) as shown in FIG. 5A, the first positioning portion 1341 is positioned at the positioning structure 1121. The arrangement of the first positioning portion 1341, the second positioning portion 1342, and the positioning structure 1121 may prevent the limiting portion 132 of the pressing force adjusting component 130 from moving away from the first location P1 or the second location P2 unexpectedly and may allow the limiting portion 132 to be accurately positioned at the first location P1 or the second location P2. In other embodiments, the pressing force adjusting component 130 may have more positioning portions and may be positioned at more, which should not be construed as a limitation in the disclosure.

In this embodiment, as shown in FIG. 2 to FIG. 4, the key structure 120 includes a key housing 122 and an elastic component 124. The elastic component 124 has the connecting end 120a and the elastic section 120c, and the key housing 122 is connected to the elastic component 124 and has the free end 120b. The key housing 122 and the elastic component 124 are, for instance, connected through magnetic attraction, so that the key housing 122 may be easily assembled and disassembled. Specifically, the elastic component 124 may be equipped with a magnet 1241, and the key housing 122 may be equipped with a screw lock S2 which may be magnetically attracted, so that the key housing 122 and the elastic component 124 may be attached by the magnet 1241 magnetically attracting the screw lock S2. In other embodiments, the key housing 122 and the elastic component 124 may be attached in another manner, or the key housing 122 and the elastic component 124 may be an integrally formed structure, which should not be construed as a limitation in the disclosure.

In this embodiment, a protruding portion 1122 of the base 112 protrudes into an anti-pull portion 1202 of the key housing 122 as shown in FIG. 4 and partially overlaps the anti-pull portion 1202, so as to prevent the key housing 122 from unexpectedly escaping from the main housing 110. In addition, the rear case 114 and the key housing 122 may stop each other, so as to prevent the key housing 122 from being unintentionally escaping from the main housing 110. Specifically, the key housing 122 has a flange 1221, and an inner surface 114a of the rear case 114 of the main housing 110 stops the flange 1221. When the mouse 100 falls, the inner surface 114a of the rear case 114 stops the flange 1221 to prevent the key housing 122 from escaping from the main housing 110, so as to prevent internal parts of the mouse 100 from being scattered or prevent damages to the key housing 122 due to separation of the key housing 122 from the main housing 110.

Figure 7A:
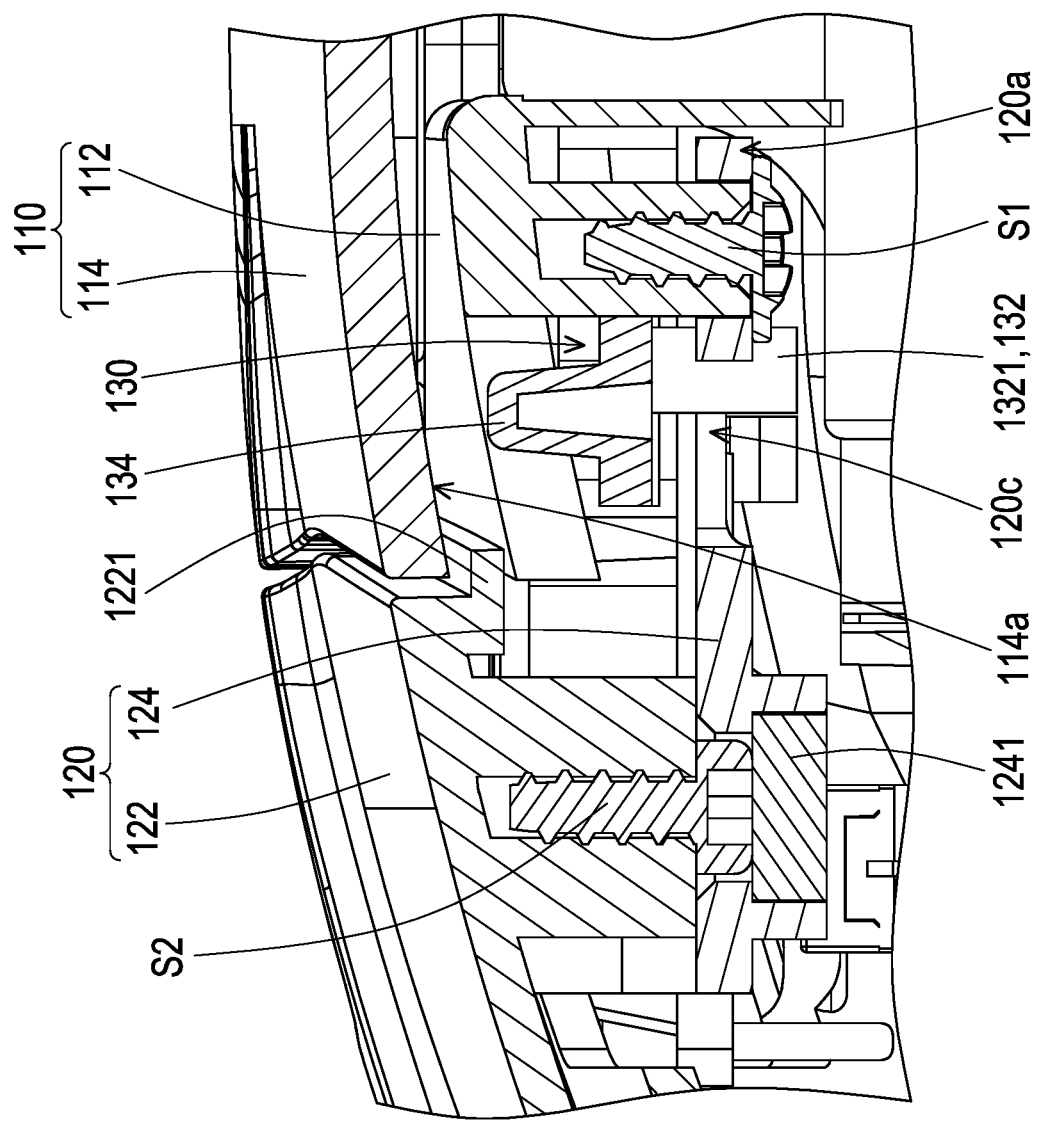
Figure 7B:
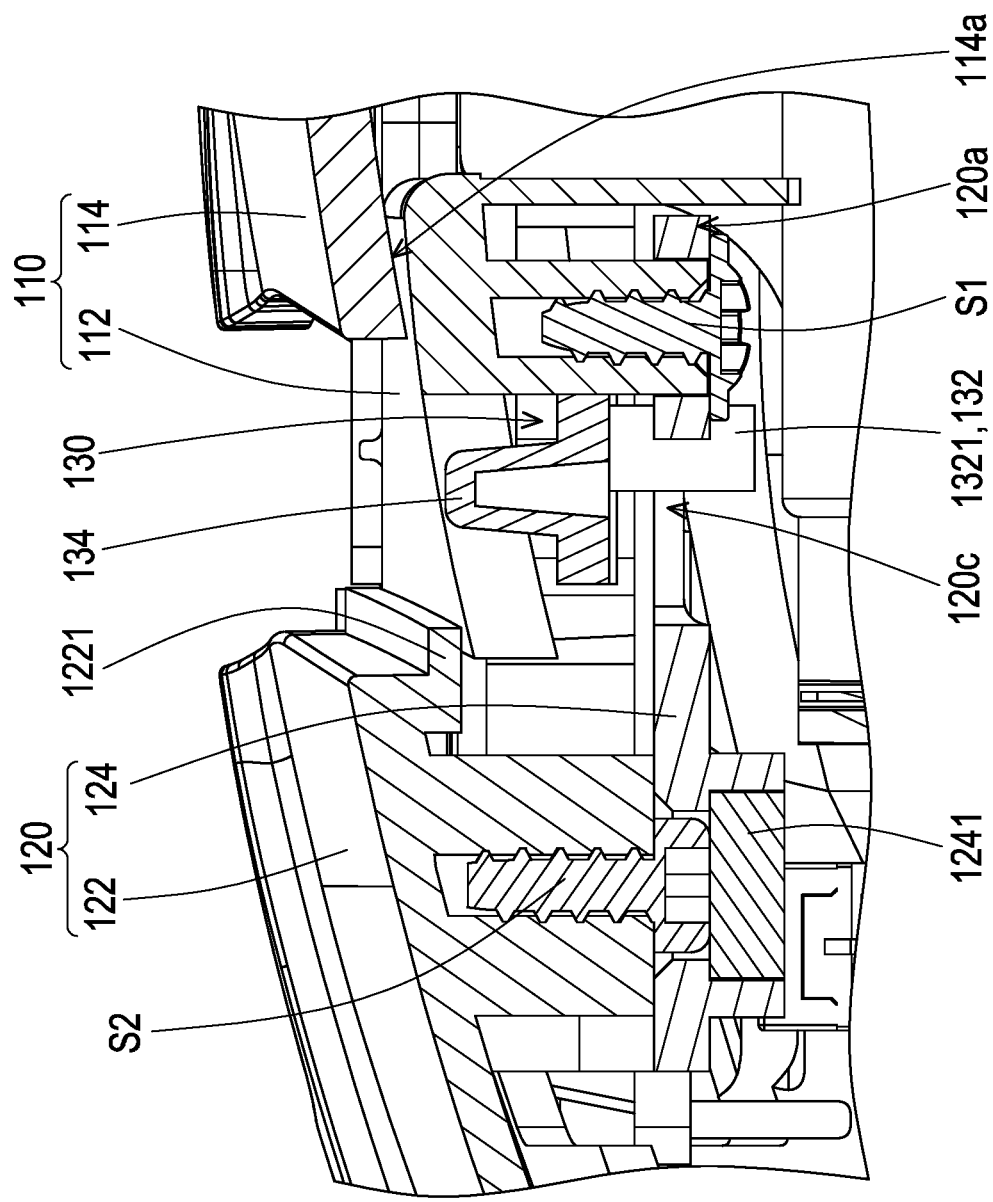
Figure 7C:
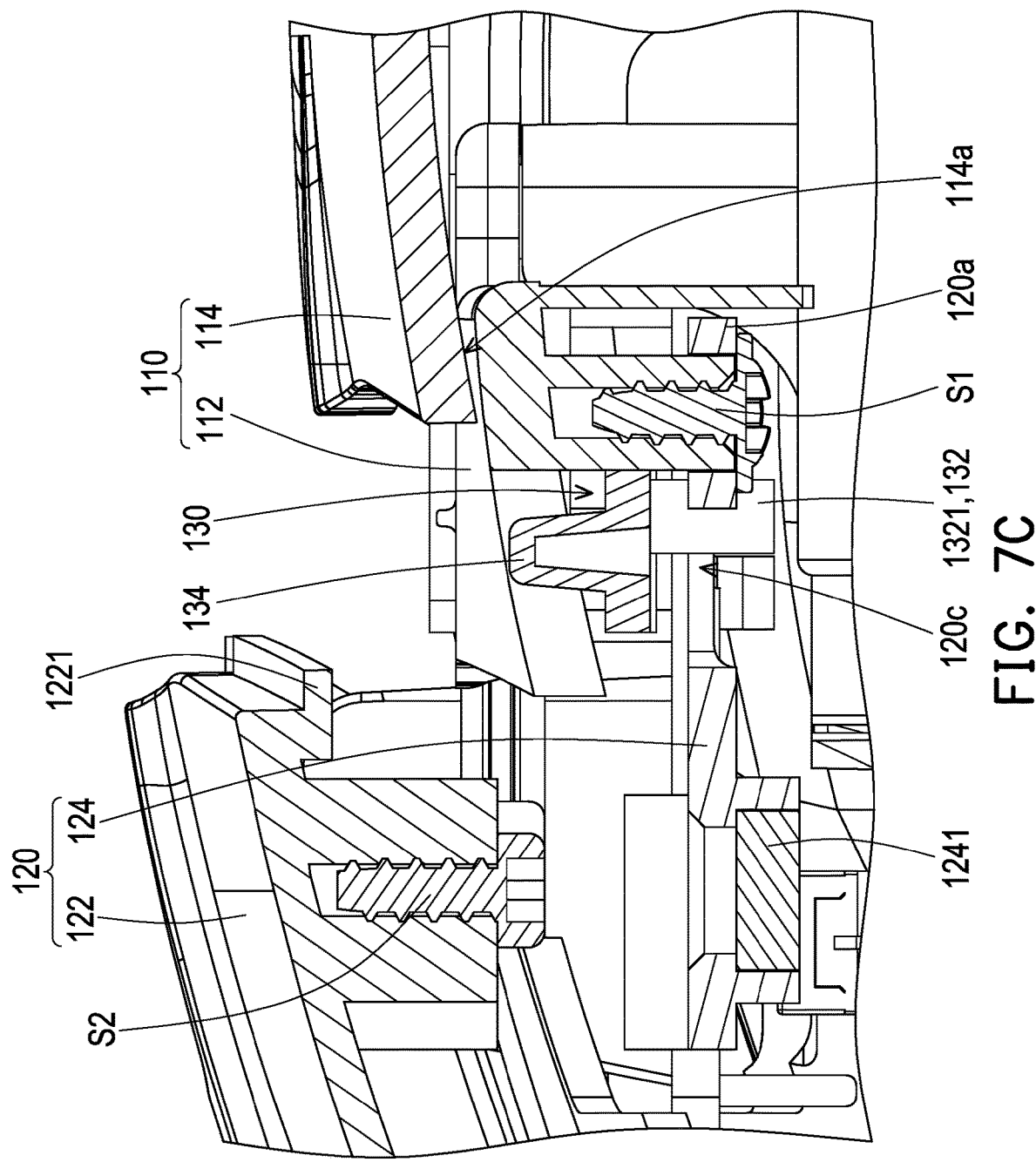

An adjustment process of the pressing force adjusting component 130 provided in this embodiment is described below. FIG. 7A to FIG. 7D illustrate an adjustment process of the pressing force adjusting component depicted in FIG. 2. First, as shown in FIG. 7A and FIG. 7B, the rear case 114 is moved backward with respect to the base 112. Next, as shown in FIG. 7B and FIG. 7C, the key housing 122 is separated from the elastic component 124 through resisting the magnetic attraction between the magnet 1241 and the screw lock S2. At this time, the push button 134 of the pressing force adjusting component 130 is exposed. A user may push the push button 134 as shown in FIG. 7C and FIG. 7D to force the push button 134 to drive the pressing force adjusting component 130 to move along the base 112, thereby adjusting the pressing force adjusting component 130. For instance, as shown in FIG. 7C, the limiting portion 132 of the pressing force adjusting component 130 is located at the second location P2 (shown in FIG. 4), and after the pressing force adjusting component 130 is driven to move along the base 112 as described above, the limiting portion 132 of the pressing force adjusting component 130 may be located at the first location P1 (shown in FIG. 4), as shown in FIG. 7D. In other embodiments, if the push button 134 of the pressing force adjusting component 130 may be exposed by dissembling or moving one of the rear case 114 and the key housing 122, it is likely to dissemble or move either the rear case 114 or the key housing 122 in the adjustment process of the pressing force adjusting component 130, which should not be construed as a limitation in the disclosure.

As shown in FIG. 1, the number of the key structure 120 in this embodiment is two, i.e., the left button and the right button of the mouse 100. Correspondingly, the number of the pressing force adjusting component 130 may be two respectively corresponding to two key structures 120. Thereby, each pressing force adjusting component 130 may be adjusted independently, so that the pressing force required by the two key structures 120 varies in response to the user's different fingers, which may accommodate operational requirements of the user and user key press feel.

Figure 8:
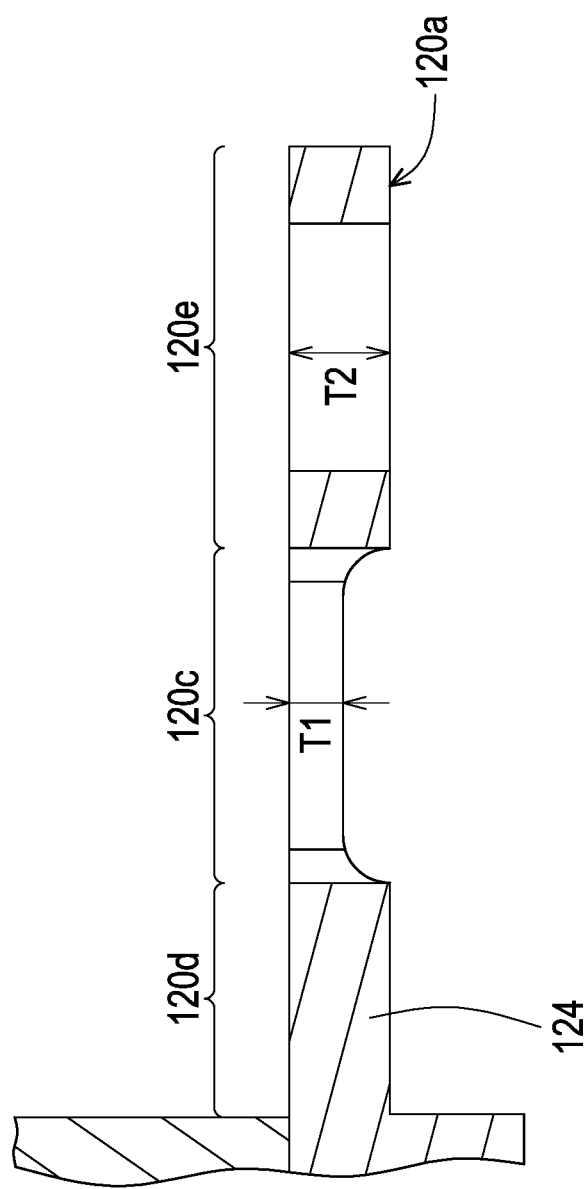
FIG. 8 is a partial enlarged view of the elastic component depicted in FIG. 3.

FIG. 8 is a partial enlarged view of the elastic component depicted in FIG. 3. With reference to FIG. 8, in this embodiment, the key structure 120 (shown in FIG. 3) has two extension sections 120d and 120e, and the two extension sections 120d and 120e are respectively connected to two opposite ends of the elastic section 120c. A thickness T1 of the elastic section 120c is less than a thickness T2 of the two extension sections 120d and 120e, so that the elastic section 120c has good elastic deformation ability. The thickness T1 of the elastic section 120c is, for instance, equal to or slightly greater than 0.8 mm.

Figure 9:
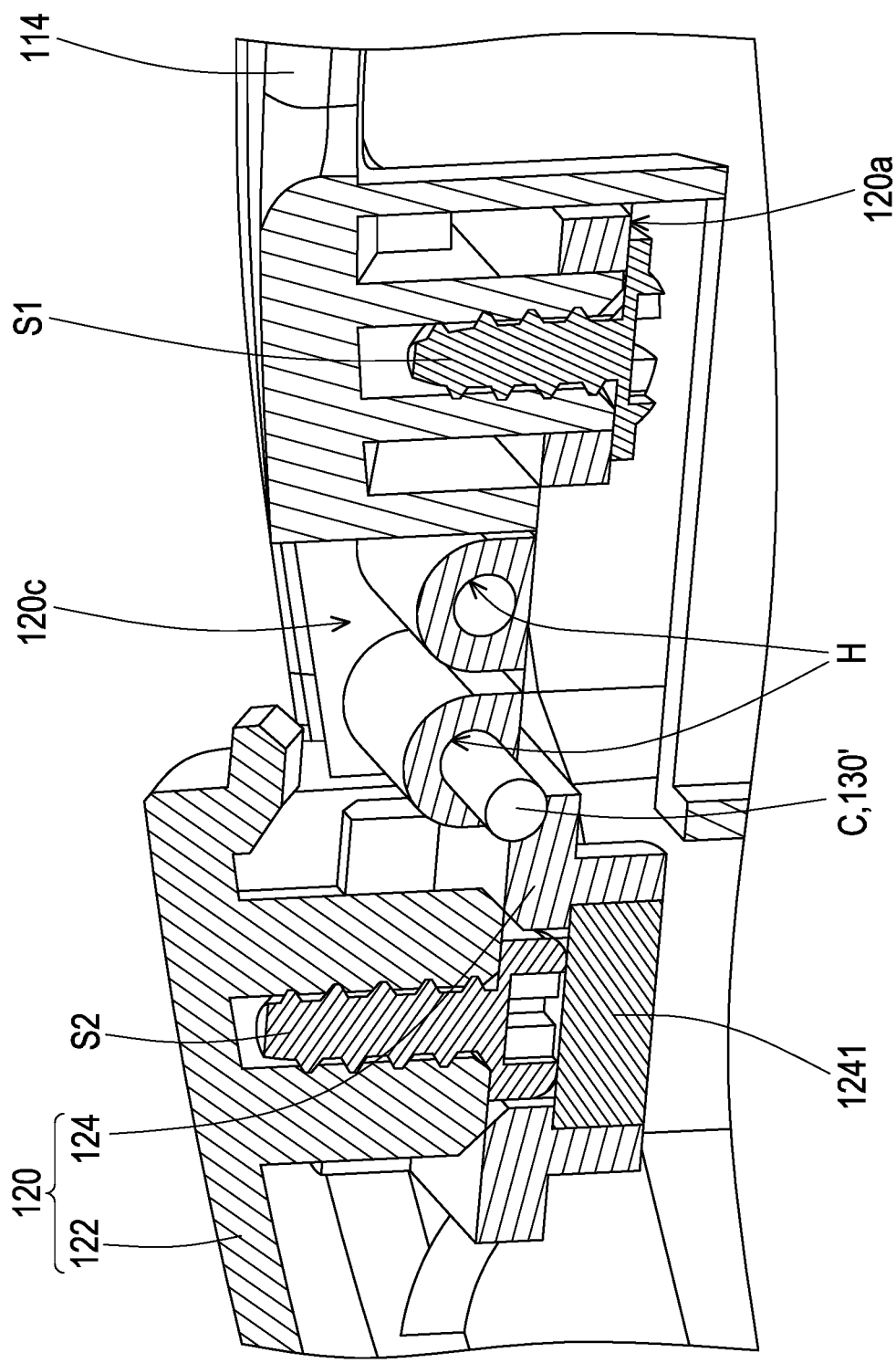
FIG. 9 is a schematic view illustrating a portion of a mouse according to another embodiment of the disclosure.

The form of the pressing force adjusting component is not limited in the disclosure. FIG. 9 is a schematic view illustrating a portion of a mouse according to another embodiment of the disclosure. The difference between the embodiment shown in FIG. 9 and the previous embodiments lies in that the pressing force adjusting component 130' shown in FIG. 9 is a cylinder C, and the elastic section 120c has at least two holes H. The cylinder C is adapted to be inserted into either hole H and connected to the main housing 110 to restrict the elastic section 120c at different locations, thus achieving the effect of changing the length of the lever arm when the key structure 120 is being pressed. FIG. 9 schematically shows the cylinder C, and the cylinder C may actually be a pin which penetrates either hole H and is positioned at a corresponding positioning hole on the base 112 of the main housing 110. Alternatively, the cylinder C may actually be a screw which penetrates either hole H and is screwed to a corresponding screw hole on the base 112 of the main housing 110.

To sum up, in the mouse provided in one or more embodiments of the disclosure, the elastic section of the key structure is additionally equipped with the pressing force adjusting component. The user may change the location of the pressing force adjusting component on the main housing to adjust the location of the limiting portion of the pressing force adjusting component at the elastic section, thereby changing the length of the lever arm of the key structure and thus achieving the effect of adjusting the pressing force on the key structure. In addition, the interference between the flange of the key housing and the rear case prevents the key housing from accidentally escaping from the main housing, so as to prevent the internal parts of the mouse from being scattered or prevent damages to the key housing due to separation of the key housing from the main housing.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A mouse, comprising:
    a main housing;
    a key structure, having a connecting end, a free end, and an elastic section, wherein the connecting end is connected to the main housing, and the elastic section is located between the connecting end and the free end; and
    a pressing force adjusting component, movably disposed on the main housing and having a limiting portion, wherein the limiting portion limits elastic deformation of the elastic section, and a location of the pressing force adjusting component on the main housing is adapted to be changed to change a location of the limiting portion at the elastic section, wherein a distance exists between the connecting end and the free end, the distance is constant when the pressing force adjusting component moves along the main housing,
    wherein a first distance exists between a first location on the elastic section and the free end, a second distance exists between a second location on the elastic section and the free end, the distance is greater than the second distance, the second distance is greater than the first distance, and the pressing force adjusting component is adapted to move along the main housing to drive the limiting portion to move between the first location and the second location.

2. The mouse according to claim 1, wherein the pressing force adjusting component has a first positioning portion and a second positioning portion, the main housing has a positioning structure, when the limiting portion is located at the first location, the second positioning portion is located at the positioning structure, and when the limiting portion is located at the second location, the first positioning portion is positioned in the positioning structure.

3. The mouse according to claim 1, wherein the key structure comprises a key housing and an elastic component, the elastic component has the connecting end and the elastic section, and the key housing is connected to the elastic component and has the free end.

4. The mouse according to claim 3, wherein the key housing and the elastic component are magnetically attracted.

5. The mouse according to claim 3, wherein the key housing has a flange, and an inner surface of the main housing stops the flange to prevent the key housing from escaping from the main housing.

6. The mouse according to claim 1, wherein the main housing has a sliding slot, and the pressing force adjusting component is slidably disposed at the sliding slot.

7. The mouse according to claim 1, wherein the limiting portion comprises at least one hook, and the at least one hook is engaged with a lower surface of the elastic section.

8. The mouse according to claim 1, wherein the main housing comprises a base and a rear case, the rear case is assembled to the base, the pressing force adjusting component movably disposed on the base, and the connecting end of the key structure is connected to the rear case.

9. The mouse according to claim 8, wherein the pressing force adjusting component has a push button, the rear case is adapted to move relative to the base to expose the push button, and the push button is adapted to be forced to drive the pressing force adjusting component to move along the base.

10. The mouse according to claim 1, comprising a switch element, wherein the switch element is disposed at the main housing, the free end of the key structure has a triggering portion, and the key structure is adapted to be pressed and trigger the switch element by the triggering portion.

11. The mouse according to claim 1, wherein the key structure has two extension sections, the two extension sections are respectively connected to two opposite ends of the elastic section, and a thickness of the elastic section is less than a thickness of the two extension sections.

12. The mouse according to claim 1, wherein the pressing force adjusting component is a cylinder, the elastic section has at least two holes, and the cylinder is adapted to pass through either of the two holes and be connected to the main housing.

* * * * *